United States Patent [19]
Bardini et al.

[11] Patent Number: 5,505,429
[45] Date of Patent: Apr. 9, 1996

[54] GATE VALVE

[76] Inventors: Armando J. Bardini, 12033 Hamley Dr., Grass Valley, Calif. 95949; Charles H. Smith, 1455 64th St., Emeryville, Calif. 94608

[21] Appl. No.: 436,628

[22] Filed: May 8, 1995

Related U.S. Application Data

[63] Continuation-in-part of Ser. No. 269,822, Jul. 1, 1994, abandoned.

[51] Int. Cl.$^6$ ...................................................... F16K 1/48
[52] U.S. Cl. ............................................ 251/326; 251/327
[58] Field of Search ..................................... 251/327, 328, 251/326; 137/315

[56] References Cited

U.S. PATENT DOCUMENTS

| | | | |
|---|---|---|---|
| 3,168,281 | 2/1965 | Yates | 251/327 |
| 3,305,208 | 2/1967 | Bredtscheuler | 251/327 X |
| 3,923,285 | 12/1975 | Riebl et al. | 251/327 X |
| 4,440,381 | 4/1984 | Tipton, Jr. | 251/320 X |
| 4,548,386 | 10/1985 | Gladisch et al. | 251/327 |

Primary Examiner—John C. Fox

[57] ABSTRACT

A gate valve structured for the removal and replacement of the valve gate, seats and seals through the flowpath of the valve, a valve body constructed as a single piece of material without covers or valve bonnet to access the seats, gate or interior parts of the valve body, a pair of bolted flanged conduits on each side of the valve body for the attachment to a pipeline and removal of the valve body from the pipeline for access to the body interior for removal of the ring seals and valve seats fitted to the body ports forming the flowpath. The installation or removal of the gate from the valve stem is accomplished by orienting the gate in the valve flowpath, unbolting a split rectangular collar from the stem through a rectangular opening in the gate, and the reorientation of the gate for the removal of a thread protector bolt from the face of the gate, and replacing it by a threaded rod which provides assistance for inserting or extracting the gate through the valve body flowpath.

9 Claims, 8 Drawing Sheets

GATE VALVE

This application is a continuation-in-part of Ser. No. 08/269,822, filed Jul. 1, 1994, now abandoned.

BACKGROUND OF THE INVENTION

Gate valves are often used in applications where the fluid mediums are very destructive of the internal parts of the valve; namely, the seats, gate, seals and the internal surfaces of the valve body. This is particularly true of valves used in the chemical, petroleum, and marine industries. The abrasive and corrosive nature of these applications, and especially at elevated temperatures and pressure, places greater emphasis on the proper selection of materials for the valve body, and the internal parts.

Heretofore it has been necessary, in some applications, to line the internal surfaces of the valve to resist the corrosive action of the medium. Because of the excessive wear in the above applications, it becomes necessary to remove and replace the seats, gate and stem frequently. Most valve bodies are cast iron and are very susceptible to corrosion, making the valve seats difficult to remove and replace. The valve refurbishment requires that new seats be threaded or welded in place in the body, and then remachined to match a new replaced wedge type gate. This is an expensive and time-consuming operation. In order to install or remove the valve seats or gate the interior of the valve must be accessed through the valve bonnet. As a result, the bonnet flange becomes very massive, since at high pressures and temperatures the bonnet and valve cavity must be designed as a high pressure vessel. This results in heavy wall thicknesses, heavy bonnet flanges, and bolts. This is especially true of the larger valves. The resulting massiveness of the larger valve makes it very expensive and impractical to make the entire body from suitable materials such as stainless steel and other metal alloys.

The objective of this invention is to overcome the above stated difficulties by making the body from a single piece of material and considerably lighter. In addition, the internal parts are all removable from the flowpath of the valve, and easily replaced by unbolting and removing the body portion of the valve from the pipeline. The valve body does not have a bonnet or access cover of any type, but takes the form of a unitized piece of material of high strength, corrosion resistant, and of low porosity.

SUMMARY OF THE INVENTION

This invention relates to gate valves and particularly to an improved design configuration employing a unitized body construction, and a seat and wedge-shaped circular gate design that permits their assembly and removal through the flowpath of the valve, rather than through the typical valve bonnet.

The gate valve formed in accordance with this disclosed invention consists of a unitized valve body having opposing upstream and downstream sides configured to contain the removable valve seats and seals. The seats are retained and positioned in the proper orientation with the wedge type gate by the flanged conduit sections that bolt up to the face of the body on each side. The flanged conduit sections contain a ring seal groove and ring seal, which is compressed into a mating split groove, half of which is in the valve body, and the other half in the valve seat. In addition, the flanged conduit sections and seats, have locating holes and dowel pins that insure the correct orientation with the valve body and gate. The valve stem is inserted into the gate by passing it through the packing gland and the rising stem nut assembly, mounted at the top of the body. The stem is secured to the gate by the two halves of a rectangular split collar which fits around a groove in the valve stem. The two halves of the split collar are assembled to the stem and gate, by passing each half through a rectangular opening in the gate from each side of the valve body. This is accomplished by orienting the gate along the axis of the flowpath so that the stem can be accessed through the valve flowpath and into the rectangular opening in the gate. The rectangular split collar is secured to the stem by two bolts.

The final assembly of the valve is accomplished when the flanged conduit sections are bolted to each side of the valve, the stem packing gland assembly installed, and the hand wheel and bearing assembly bolted on to the valve body. The valve assembly is welded directly into a pipeline at the tubular end of the flanged conduits on each side of the valve body. The valve body assembly can be removed from the pipeline by unscrewing the bolts that secure the flanged conduits to the body. An optional method of installing the valve to a pipeline is to weld standard flanges to the tubular end of each flanged conduit and bolting the valve to existing flanges in the pipeline.

DISCUSSION OF REFERENCE PATENTS CITED

In U.S. Pat. No. 4,706,934 is a representation of a typical gate valve with the interior of the valve accessed through the stem end bonnet.

In U.S. Pat. No. 3,689,028 is a representation of a similar cast gate valve where the seats are accessed through a bottom opening and closure, and the gate through the valve bonnet.

In U.S. Pat. No. 3,624,882 is a representation of a similar cast valve where flexible seats are installed permanently through the flowpath of the valve and the gate installed or removed through the valve bonnet.

In U.S. Pat. No. 4,773,627 is a similar valve construction where the seats are installed through the flowpath, but the gate again is installed through a valve bonnet.

In U.S. Pat. No. 4,548,386 is a representation of a gate valve requiring a bonnet for the removal of the gate and the valve seats are welded in place.

In U.S. Pat. No. 4,440,382 is a representation of a gate valve with a bonnet for the removal of the gate and its attachment to the stem.

In U.S. Pat. No. 3,305,208 shows segmented circular threaded means for valve stem attachment to valve gates.

In U.S. Pat. No. 3,923,285 shows a split circular hub providing means for stem attachment and a bonnet opening for gate installation and stem attachment.

In U.S. Pat. No. 3,168,281 shows a method for providing flexibility to a cast valve gate and gate configured for installation into a valve body through a bonnet.

In summary, the patent application differs structurally from the prior arts cited in the following ways:

(a) A single piece body without access cover or bonnet.

(b) A circular valve gate installed or removed through the flowpath of the valve.

(c) A single seal on each side of valve which seals two independent leakage paths.

(d) The stem is attached to the valve gate through the flowpath of the valve and the rectangular opening in the valve gate.

DETAILED DESCRIPTION OF THE DRAWINGS

Figure 1:
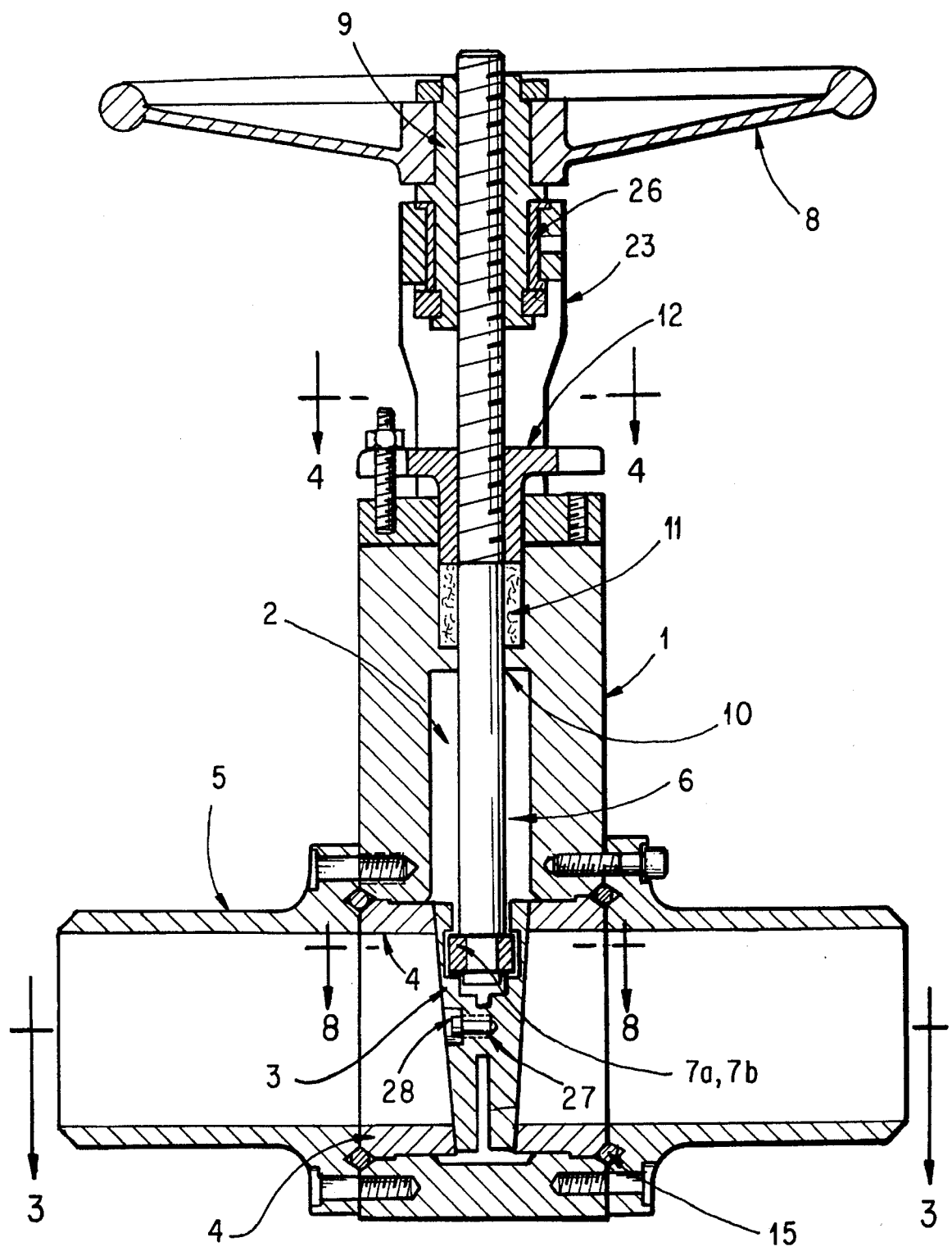
FIG. 1 is a detailed cross section taken through the valve and flowpath.
Figure 2:
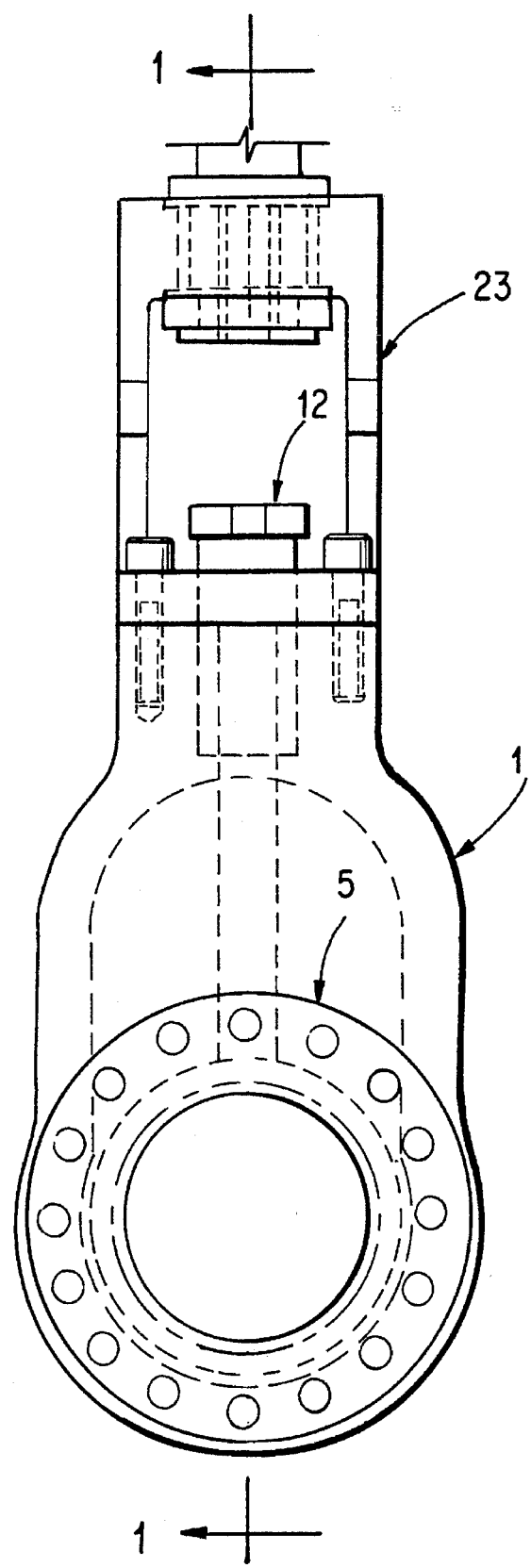
FIG. 2 is a view showing the face of the body and flanged conduit section in place.
Figure 5:
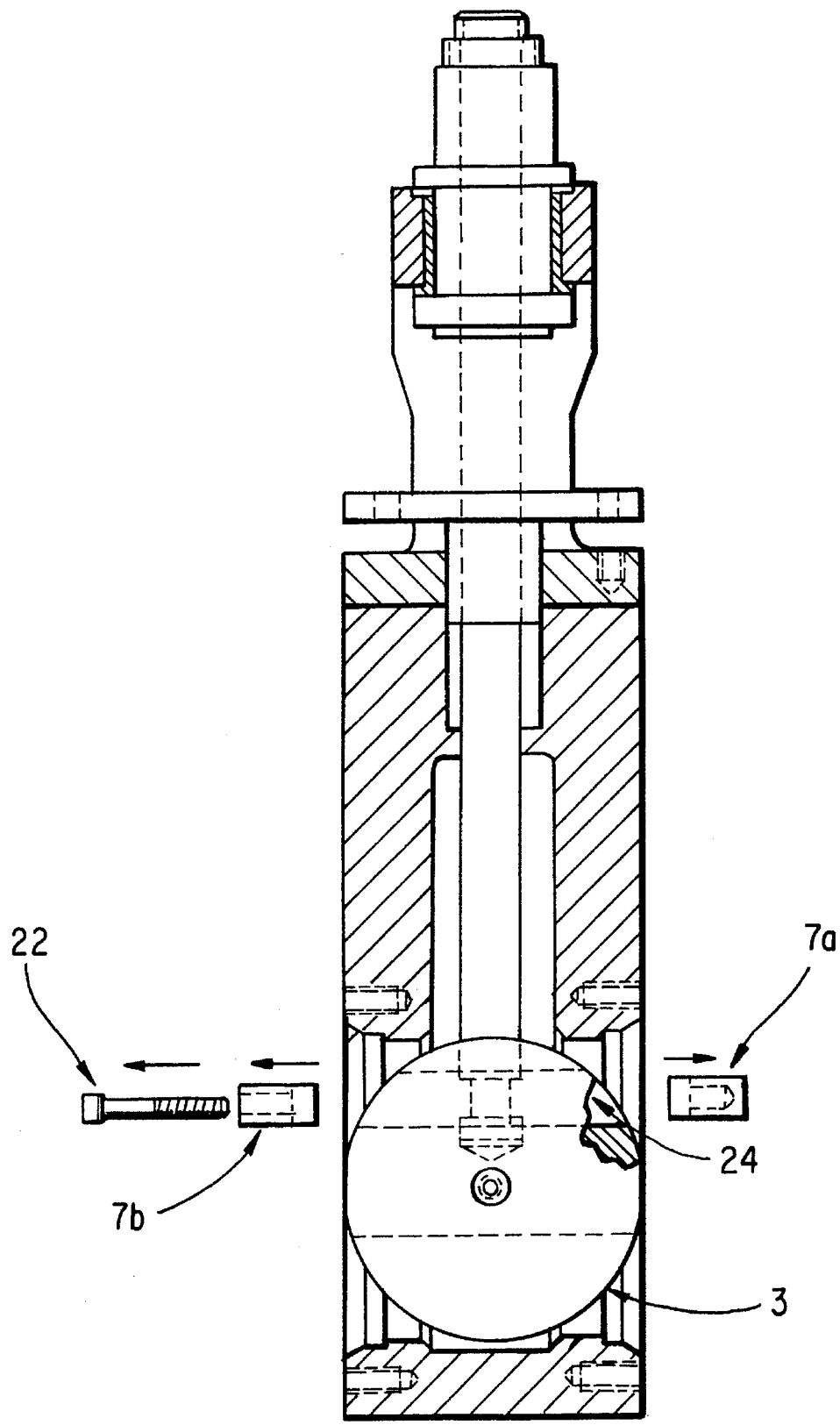
FIG. 5 is a vertical section showing an exploded view of the stem attaching block being unbolted and releasing the gate from the stem.
Figure 7:
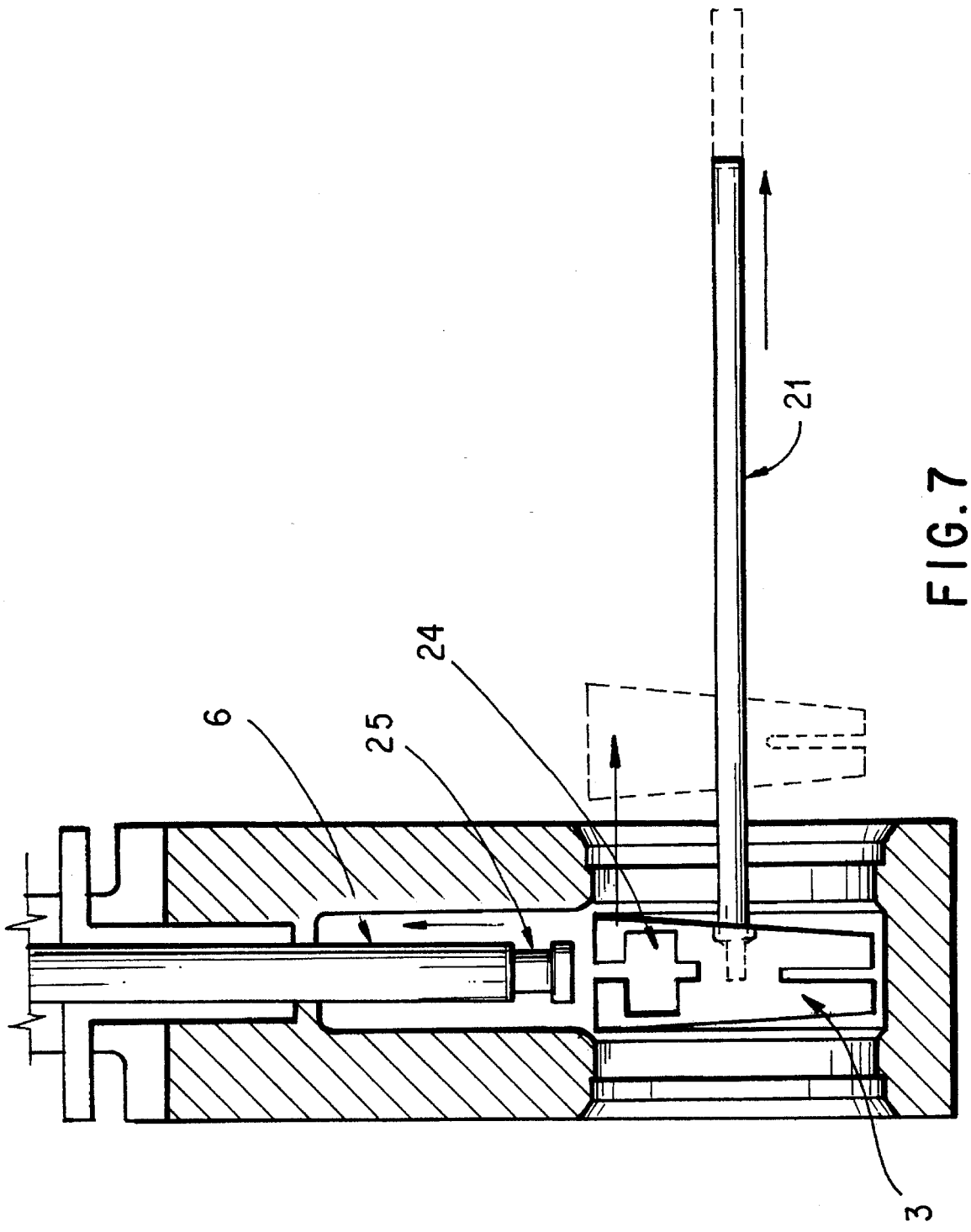
FIG. 7 is a cross-section showing the gate free from the stem and ready for removal from the body through the flowpath.
Figure 8:
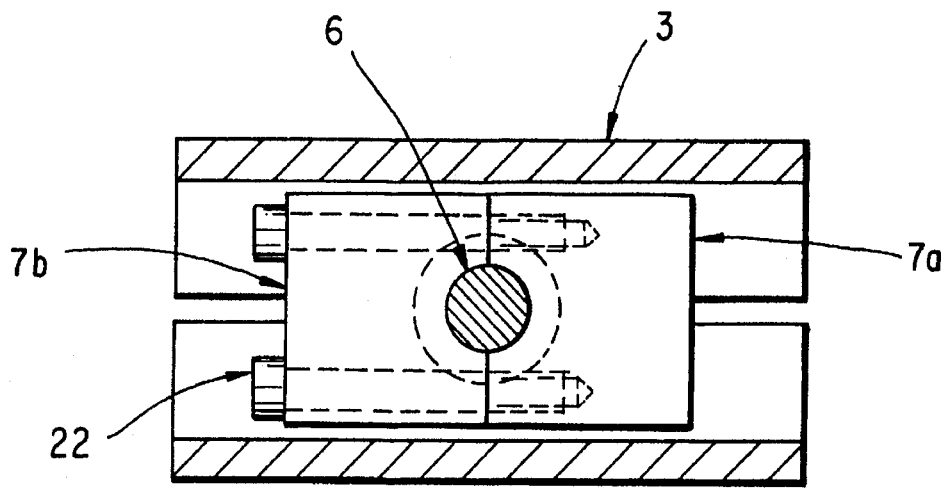
FIG. 8 is a cross-section through the gate and the stem attachment block.
Figure 9:
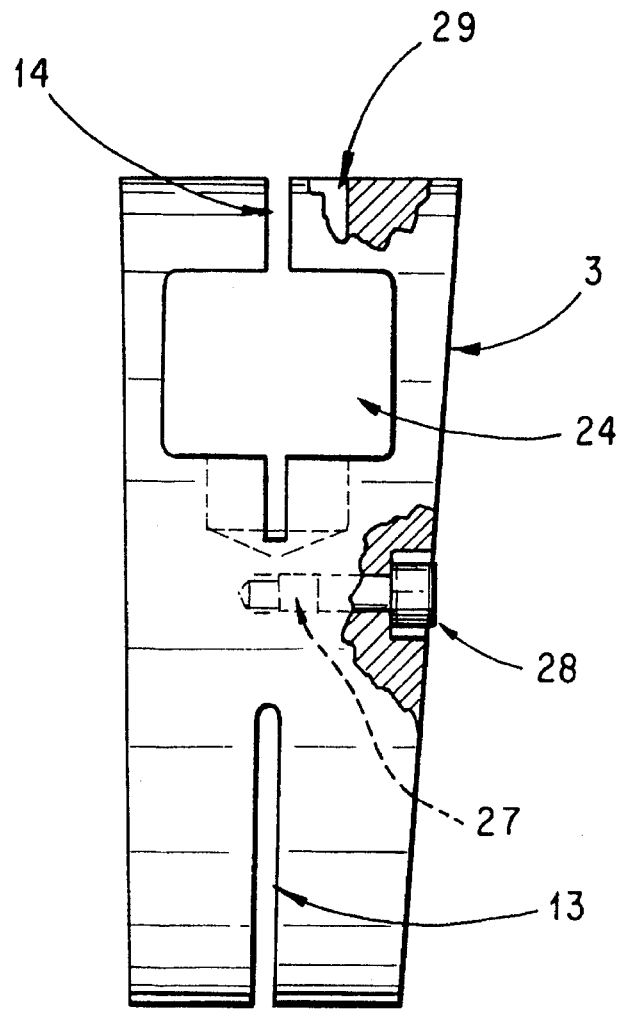
FIG. 9 shows details of the gate.

Referring to FIGS. 1 and 2 a gate valve configured in accordance with this invention generally comprising a valve body 1, with a transverse opening forming the flowpath made from a single piece of material with a cavity 2, located between the two parallel joining faces of the body. The cavity 2, is configured to allow free movement of the tapered circular valve gate 3, into and out of the flowpath formed by the flanged conduit 5, bolted on each side of the valve body 1, and the tapered valve seat 4, inserted into the counterbore on each side of the body. Stem 6, is attached to the gate 3 by means of a split collar assembly 7a and 7b (see FIG. 8). The threaded stem 6 is passed through the packing gland assembly comprising of the hand wheel bearing support frame 23, and the packing gland compression adapter hub 12. FIGS. 7 and 5 show how the stem 6 is free to enter a hole 29, at the top of the circular gate 3, and positioned into the gate. The two valves of the said split collar 7a and 7b are assembled around a groove on the valve stem 25 (see FIG. 5) by passing each half of the split collar assembly through the transverse opening 24 in the tapered gate. (See FIGS. 7 and 9.) The stem 6 is secured to the gate by threading the two bolts 22 into the threaded half of the split collar assembly 7a. Referring to FIG. 9, which shows the gate partially cut through by the deep grooves 13 and 14. The partial separation of the gate into two halves, provides a degree of resiliency to the gate allowing it to conform to the matching tapered surfaces of the valve seats 4, when the valve handwheel and threaded nut forces the gate into contact with the opposing valve seats. FIG. 5 shows how the gate is oriented so that the stem can be secured to the gate through the valve flowpath from each side of the valve body. The stem opening 10, into the valve body cavity 2, is sealed by the packing gland 11, when compressed against the unthreaded portion of the stem 6 by means of the compression adapter hub 12.

Figure 6:
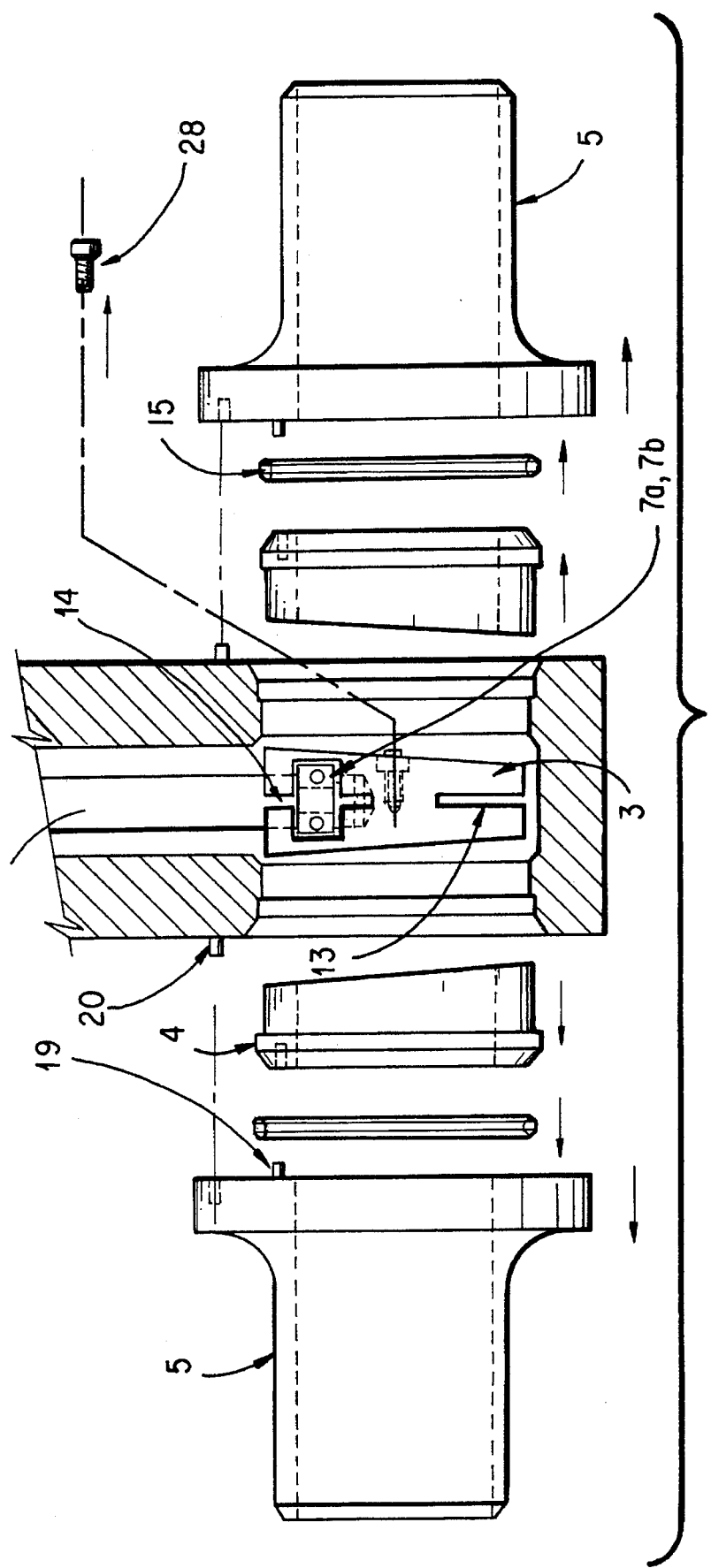
FIG. 6 is an exploded view showing the seats, flanged conduit sections, ring seals removed and the gate attached to the stem.

The flow through the gate valve is occluded when the tapered circular gate 3 is forcibly driven in contact with the opposing and matching tapered surfaces of the valve seats 4, by means of the handwheel 8, and the attached rotating stem nut 9, which reacts against the bearing support frame 23. Referring to FIG. 6, the correct orientation of the tapered gate 3, and the matching tapered surfaces of the valve seats 4, is provided by the locating pins 19 and 20 on the flanged conduits 5, and the tapered valve and the corresponding holes in the flanged conduits 5 and the valve seats 4.

As previously referred to, FIG. 5 shows how the gate can be attached or detached by orienting the gate 3, perpendicular to the faces of the valve body 1. The two-piece split collar assembly 7a and 7b can be accessed and removed through the flowpath of the valve by unscrewing the two bolts 22. After the removal of the split collar assembly and bolts, the gate is rotated back to a plane parallel to the joining faces of the body 1, and the gate removed from the valve body by first removing the threat protector bolt 28, and threading the extractor rod 21 into tapped hole 27 in the face of the gate 3. The circular gate 3 can now be supported by the extractor rod 21, and moved freely through the smaller diameter valve body ports (see FIG. 7).

Figure 3:
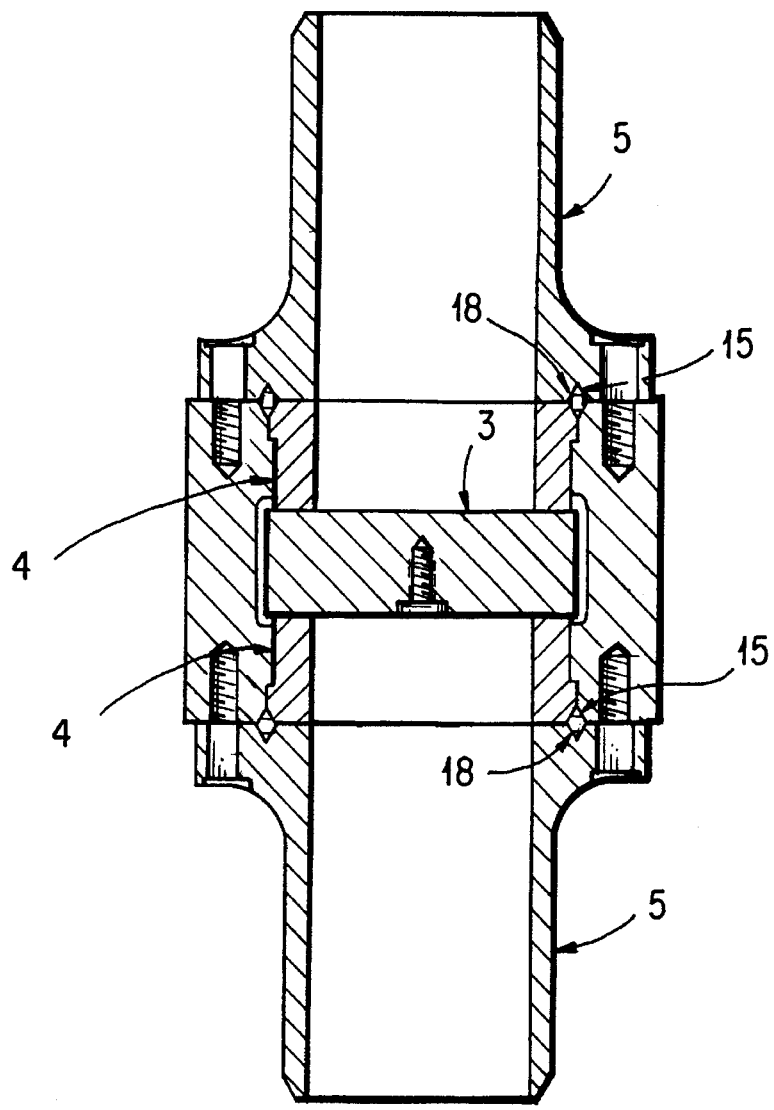
FIG. 3 is a horizontal cross-section showing the principle parts in position.
Figure 4:
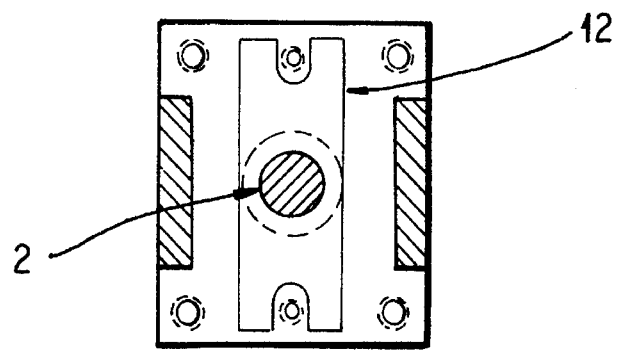
FIG. 4 is a cross-section through the stem and packing gland and rising stem assembly.
Figure 10:
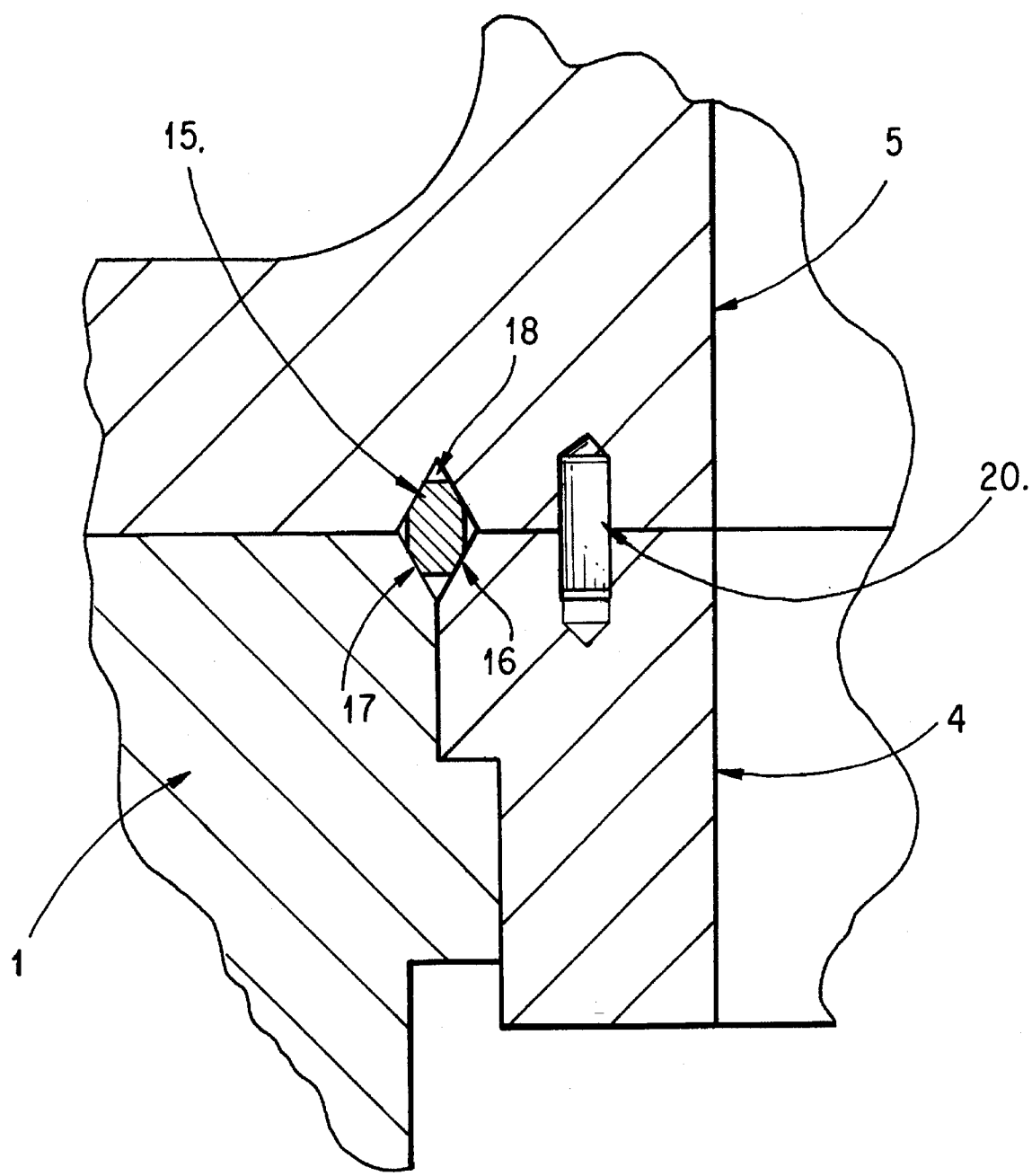
FIG. 10 shows details of the seal grooves.

FIGS. 3 and 10 show how a single ring seal 15, one on each side of the valve body, seals the flowpath from the exterior of the gate valve. This is accomplished by the wedging contact with the groove 18, in each of the flanged conduit sections 5, and the opposing grooves formed by one-half of a tapered groove 17, in the valve body 1 and the other half 16 in the valve seat 4.

FIG. 6 shows an exploded view of the principle parts comprising the valve flowpath with the gate in a position to occlude flow. The locating dowel pins 19 and 20 in both sides of the valve provide means for aligning the tapered surfaces of the gate with the matching tapered surfaces of the valve seats. Since the split collar assembly 7a and 7b fits loosely in the said gate transverse opening 24, the gate is free to align and make sliding contact with the valve seats. In addition as previously indicated, the separating grooves 13 and 14 allow the two sides of the gate to deflect or deform into contact with the seats.

It is understood that the invention is not limited to the specified embodiment set forth herein but is to be limited only by the scope of the attached claim or claims, including the full range of equivalency to which each element thereof is entitled.

What is claimed:

1. A gate valve having means for the replacement of a valve gate, valve seats, and also the connecting or disconnecting of a valve actuating stem from the said valve gate through the valve flowpath, comprising:

(a) a valve body (1) having a transverse opening therethrough defining a flowpath, said flowpath having an inside diameter greater than the outside diameter of a valve gate (3), whereby the valve gate can enter therein, said transverse opening intersects a cavity (2) projecting longitudinally between opposing faces perpendicular to the transverse opening of the said valve body, and a valve actuating stem opening (10) entering the said cavity along the longitudinal centerline of the valve body, with the transverse opening having at each end a stepped counterbore concentric therewith and a tapped bolt hole pattern of four or more tapped holes on the said opposing faces of the valve body;

(b) a valve seat (4) removably mounted in the said stepped counterbore at each end of the transverse opening of the valve body, said valve seat having a bore coaxial with the transverse opening in the valve body further defining the valve flowpath, the outside diameter of the valve seat having a shoulder registering with the stepped counterbore in the valve body, with one end of the valve seat having a flat face perpendicular to the said coaxial bore and the opposite end of the valve seat canted at an angle with a reference plane centered between and parallel to the opposing faces of the valve body, the said reference plane being perpendicular to the transverse axis of the valve flowpath;

(c) a valve gate (3) having a diameter smaller than that of the transverse opening of the valve body, defining means for entry of said gate through the valve body flowpath, said valve gate having a rectangular opening (24) through the side of the gate, with said rectangular opening centered between the opposing faces of the valve gate, and additionally a hole (29) entering the rectangular opening along a central axis of the valve gate and perpendicular to the central axis of the rectangular opening;

(d) a rectangular collar split into two opposing parts with the first part (7a) tapped and the second part (7b) drilled for bolted assembly and each of the said opposing parts include a semicircular cutout, with said cutouts cooperating to form a complete circular hole when the opposing parts are bolted together, whereby the said semicircular cutouts interpose with a groove (25) on a valve actuating stem (6) when attached therewith;

(e) a removable flanged conduit (5) with one end flanged, said flange having a flat side perpendicular to the valve body flowpath, with a bolt hole pattern with four or more holes for attachment to each side of the valve body (1), the other end a conduit with a bore coaxial with the valve body flowpath, whereby said flanged conduits provide means for the attachment to a pipeline, containment of the valve seat, seals and access to the valve body interior for the installation and removal of the valve gate.

2. The gate valve according to claim 1 wherein the valve body (1) can be further characterized in including means for the attachment of a valve actuating mechanism, whereby the said mechanism engages a threaded portion of a valve stem (6) extending out of the said valve body and thereby providing means for imparting motion for moving the said valve stem in the valve opening and valve closing direction, and a dowel pin (20) on the said bolt hole pattern on each of the opposing faces of the valve body providing means for aligning the valve body with the flanged conduit (5) by engaging a corresponding hole in the flanged conduit.

3. The gate valve according to claim 1 wherein the valve seat (4) can be further characterized in including a dowel pin hole on the face of the valve seat engaging a corresponding dowel pin (20) on the removable flanged conduit (5) thereby providing means for the annular orientation with the valve body insuring slidable contact between the canted surfaces of the valve seat and the opposing canted surface on the valve gate (3).

4. The gate valve according to claim 1 wherein the rectangular split collar comprising the said first part (7a) and the second part (7b) whereby the first part and second part enter through the valve flowpath and into the rectangular opening (24) in the valve gate from both sides of the valve body, when the valve gate is appropriately oriented in the valve body, thereby enterposing the groove (25) on the pre-positioned valve actuating stem (6) in the gate rectangular opening, and attaching therewith when the first and second part are bolted together.

5. The gate valve according to claim 1, wherein the said valve gate (3) can be further characterized in including a groove (14) partially separating the opposing faces of the gate (3) by entering along a reference plane centered between the opposing canted faces of the gate and parallel with the central axis of the said rectangular opening (24), continuing therethrough and penetrating to a point short of the geometric center of the gate, likewise a groove (13) entering from the opposite side of the gate along the same reference plane penetrating to a point short of the geometric center of the gate, leaving an attached and deformable central section of a mathematically correct width, and additionally a tapped hole in the face of the gate providing means for attaching a gate extractor rod (21).

6. The gate valve according to claim 1 whereby a single ring seal (15) on each side of the valve body seals both a leakage path from the valve body cavity and a leakage path from the valve flowpath by compressibly contacting a tapered surface (16) on the valve seat and an adjacent tapered surface (17) on the valve body, cooperating to form a complete seal groove on one side of the ring seal, the opposite side of the ring seal compressibly contained within the seal groove (18) on the face of the flanged conduit (5).

7. The gate valve according to claim 1 whereby a single annular groove (25) on a valve actuating stem (6) of uniform diameter, provides means for attachment to a valve gate.

8. The gate valve according to claim 1 wherein the said rectangular split collar can be further characterized in including a rectangular cross section slightly smaller than that of the rectangular opening (24) in the valve gate, whereby the mathematically correct clearance with the four sides of the rectangular split collar permits the gate to freely align with the canted surfaces on the valve seats (4).

9. The gate valve according to claim 1 wherein the valve body is formed by an integral one-piece mass of material.

* * * * *